(12) United States Patent
Klinecky et al.

(10) Patent No.: US 11,617,231 B2
(45) Date of Patent: Mar. 28, 2023

(54) DEVICE FOR SELECTIVELY HEATING A TARGET WITH IR RADIATION

(71) Applicant: Heraeus Noblelight GmbH, Hanau (DE)

(72) Inventors: Martin Klinecky, Hanau (DE); Maik Kussner, Hanau (DE); Freddy Baruch, São Paulo (BR); Oliver Weiß, Hanau (DE); Thomas Piela, Hanau (DE); Christoph Sternkiker, Hanau (DE); Jürgen Weber, Hanau (DE)

(73) Assignee: HERAEUS NOBLELIGHT GMBH, Hanau (DE)

( * ) Notice: Subject to any disclaimer, the term of this patent is extended or adjusted under 35 U.S.C. 154(b) by 218 days.

(21) Appl. No.: 16/650,255

(22) PCT Filed: Sep. 27, 2018

(86) PCT No.: PCT/EP2018/076312
§ 371 (c)(1),
(2) Date: Mar. 24, 2020

(87) PCT Pub. No.: WO2019/063713
PCT Pub. Date: Apr. 4, 2019

(65) Prior Publication Data
US 2020/0275531 A1   Aug. 27, 2020

(30) Foreign Application Priority Data
Sep. 29, 2017  (EP) ..................... 17194236

(51) Int. Cl.
H05B 3/14   (2006.01)
B29C 35/08  (2006.01)
H05B 3/20   (2006.01)

(52) U.S. Cl.
CPC ......... *H05B 3/148* (2013.01); *B29C 35/0805* (2013.01); *H05B 3/20* (2013.01); *B29C 2035/0822* (2013.01)

(58) Field of Classification Search
CPC .... B29C 2035/0822; B29C 2045/0075; B29C 59/16; B29C 64/264; B29C 64/277; B29C 65/1412; B29C 65/7473; B29C 71/04
See application file for complete search history.

(56) References Cited

U.S. PATENT DOCUMENTS 6,932,599 B1 *  8/2005  Hartung ............... A61C 19/004
433/29
2003/0194226 A1  10/2003  Miller et al.
(Continued)

FOREIGN PATENT DOCUMENTS

CN   106290219   1/2017
CN   106415810   2/2017
(Continued)

OTHER PUBLICATIONS

Japanese Office Action dated Apr. 6, 2021 in corresponding Japanese Patent Application No. 2020-516554.
(Continued)

*Primary Examiner* — Stella K Yi
(74) *Attorney, Agent, or Firm* — Panitch Schwarze Belisario & Nadel LLP

(57) ABSTRACT

A device for heating a target with IR radiation, a process for heat treating a target, a process for making a composite, a use of an IR source, a use of an array of IR sources and a use of the device. Also disclosed is a device for treating a target, comprising an IR source that emits IR radiation from an emitter surface having a first surface area; and a set of elongate bodies consisting of one or more elongate bodies, each elongate body having an inlet, collectively called the inlets, and each elongate body having an outlet, collectively (Continued)

called the outlets; wherein the emitted IR radiation is coupled into the set of elongate bodies via the inlets and decoupled from the elongate body via the outlets over an outlet surface having a second surface area; and wherein the first surface area is greater than the second surface area.

17 Claims, 8 Drawing Sheets

(56) References Cited

U.S. PATENT DOCUMENTS

| | | | |
|---|---|---|---|
| 2003/0235800 | A1 | 12/2003 | Kadar |
| 2007/0272398 | A1 | 11/2007 | Chan |
| 2008/0265789 | A1* | 10/2008 | Bertram ............ F21S 41/153 313/498 |
| 2016/0007412 | A1 | 1/2016 | Busche et al. |
| 2016/0219650 | A1 | 7/2016 | Matsunami et al. |
| 2016/0381732 | A1 | 12/2016 | Moench et al. |
| 2017/0215231 | A1 | 7/2017 | Doerk et al. |

FOREIGN PATENT DOCUMENTS

| | | |
|---|---|---|
| CN | 106471609 A | 3/2017 |
| DE | 3442804 | 6/1986 |
| EP | 1374797 | 1/2004 |
| JP | H08299280 A | 11/1996 |
| JP | 2000126886 | 9/2000 |
| JP | 2002510566 | 4/2002 |
| JP | 2003509111 | 3/2003 |
| JP | 2005001383 | 1/2005 |
| JP | 2005014401 | 1/2005 |
| JP | 2007520864 | 7/2007 |
| JP | 2013003540 | 1/2013 |
| JP | 2013020714 | 1/2013 |
| JP | 2013001610 | 7/2013 |
| JP | 2015088481 | 5/2015 |
| JP | 2017128500 A | 7/2017 |
| JP | 2017522730 | 8/2017 |
| WO | 2003019983 | 3/2003 |
| WO | 2005078356 | 8/2005 |

OTHER PUBLICATIONS

Chinese Office Action dated Jul. 28, 2021 in corresponding Chinese Patent Application No. 201880063577.3.
International Search Report and Written Opinion dated Dec. 11, 2018 for corresponding International Patent Application No. PCT/EP2018/076312.
Japanese Office Action dated Dec. 7, 2021 in corresponding Japanese Patent Application No. 2020-516554.
Lu et al., "Top-Down Analysis and Design," Modem Network Technology Course, Xidian University Press, pp. 1-14 (2011) (with English Translation).
Office Action dated Apr. 1, 2022 in CN Application No. 201880063577.3 (English Translation Only).
Office Action dated Aug. 23, 2022 in JP Application No. 2020516554.

* cited by examiner

DEVICE FOR SELECTIVELY HEATING A TARGET WITH IR RADIATION

CROSS REFERENCE TO RELATED APPLICATIONS

This application is a U.S. National Phase filing of International Patent Application No. PCT/EP2018/076312 filed on Sep. 27, 2018, which claims the priority of European Patent Application No. 17194236.0 filed on Sep. 29, 2017. The disclosures of these applications are hereby incorporated by reference in their entirety.

FIELD OF THE INVENTION

In general, the invention relates to a device for heating a target with IR radiation. More specifically, the invention relates to a device, a process for heat treating a target, a process for making a composite, a use of an IR source, a use of an array of IR sources and a use of the device.

BACKGROUND OF THE INVENTION

Devices and processes for heating a target have numerous industrially important applications including molding and forming of thermoplastics; curing of substrates and substrate surfaces, especially of plastic substrates; curing of coatings; chemical activation; welding; burr removal; sterilization; cleaning and oxidation. A number of approaches to heating a target presented in the state of the art employ a simple thermal emitter, which can be approximated by a black body. Such approaches can suffer from the disadvantage that the wavelength of the radiation cannot be easily controlled and selective and controlled heating is not possible. A number of approaches presented in the art employ direct heating from an emitter and can suffer from the disadvantage of uneven heating of a target surface. There exists a need in the state of the art for improved approaches to heating a target, in particular for heating a non-flat target surface or for selective heating of a composite target.

SUMMARY OF THE INVENTION

The invention is generally based on the object of overcoming at least one of the problems encountered in the state of the art in relation to heating a target.

An object of the invention is to provide a device for applying IR radiation with a reduced wavelength bandwidth to a target.

An object of the invention is to provide a device for applying IR radiation with a well-defined wavelength to a target.

An object of the invention is to provide a device for applying IR radiation with a controllable wavelength to a target.

An object of the invention is to provide a device for heating a target.

An object of the invention is to provide a device for melting a target.

An object of the invention is to provide a device for selectively heating a constituent of a composite.

An object of the invention is to provide a device for selectively melting a constituent of a composite.

An object of the invention is to provide a device for creating a composite.

An object of the invention is to provide a device for applying IR radiation selectively to part of a target surface.

An object of the invention is to provide a device for applying IR radiation to a target while reducing heating of the target by conduction.

An object of the invention is to provide a device for applying IR radiation to a target while reducing heating of the target by convection.

An object of the invention is to provide a device for applying IR radiation with a well-defined wavelength to a target while reducing the application of radiation with other wavelengths to the target.

An object of the invention is to provide a device for removing irregularities from a target.

An object of the invention is to provide a device for removing molding burrs from a target.

An object of the invention is to provide a device for treating a molded item.

An object of the invention is to provide a device for heating a plastic.

An object of the invention is to provide a device for melting a plastic.

An object of the invention is to provide a process for applying IR radiation with a reduced wavelength bandwidth to a target.

An object of the invention is to provide a process for applying IR radiation with a well-defined wavelength to a target.

An object of the invention is to provide a process for applying IR radiation with a controllable wavelength to a target.

An object of the invention is to provide a process for heating a target.

An object of the invention is to provide a process for melting a target.

An object of the invention is to provide a process for selectively heating a constituent of a composite.

An object of the invention is to provide a process for selectively melting a constituent of a composite.

An object of the invention is to provide a process for creating a composite.

An object of the invention is to provide a process for applying IR radiation selectively to part of a target surface.

An object of the invention is to provide a process for applying IR radiation to a target while reducing heating of the target by conduction.

An object of the invention is to provide a process for applying IR radiation to a target while reducing heating of the target by convection.

An object of the invention is to provide a process for applying IR radiation with a well-defined wavelength to a target while reducing the application of radiation with other wavelengths to the target.

An object of the invention is to provide a process for removing irregularities from a target.

An object of the invention is to provide a process for removing molding burrs from a target.

An object of the invention is to provide a process for treating a molded item.

An object of the invention is to provide a process for heating a plastic.

An object of the invention is to provide a process for melting a plastic.

A particular object of the invention is to provide a device for treating a target with increased selectivity of location.

A particular object of the invention is to provide a device for heating a target with increased selectivity of location.

A particular object of the invention is to provide a device for melting a target with increased selectivity of location.

A particular object of the invention is to provide a device for removing burrs from a target with increased selectivity of location.

A particular object of the invention is to provide a device for treating inaccessible locations in a target, in particular cavities.

A particular object of the invention is to provide a device for heating inaccessible locations in a target, in particular cavities.

A particular object of the invention is to provide a device for melting inaccessible locations in a target, in particular cavities.

A particular object of the invention is to provide a device for removing burrs from inaccessible locations in a target.

A particular object of the invention is to provide a process for treating a target with increased selectivity of location.

A particular object of the invention is to provide a process for heating a target with increased selectivity of location.

A particular object of the invention is to provide a process for melting a target with increased selectivity of location.

A particular object of the invention is to provide a process for removing burrs from a target with increased selectivity of location.

A particular object of the invention is to provide a process for treating inaccessible locations in a target, in particular cavities.

A particular object of the invention is to provide a process for heating inaccessible locations in a target, in particular cavities.

A particular object of the invention is to provide a process for melting inaccessible locations in a target, in particular cavities.

A particular object of the invention is to provide a process for removing burrs from inaccessible locations in a target, in particular cavities.

A contribution to achieving at least one of the above described objects is made by the subject matter of the disclosed invention. A further contribution is made by the subject matter of the invention which represents specific embodiments of the invention.

A contribution to achieving at least one of the above objects is made by the following 36 numbered embodiments.

1. A device for treating a target, the device comprising the following:
    a. an IR source adapted and arranged to emit IR radiation from an emitter surface having a first surface area;
    b. a set of elongate bodies consisting of one or more elongate bodies, preferably two or more, more preferably five or more, more preferably ten or more, more preferably 20 or more, each elongate body having an inlet, collectively referred to as the inlets, and each elongate body having an outlet, collectively referred to as the outlets;
    wherein IR radiation emitted from the IR source is coupled into the set of elongate bodies via the inlets and decoupled from the elongate body via the outlets over an outlet surface having a second surface area;
    wherein the first surface area is greater than the second surface area. Preferably the first surface area is at least two times as great as the second surface area, more preferably at least five times, more preferably at least ten times, more preferably at least 100 times.

In one aspect of this embodiment, the IR source is a thermal IR source and the first surface area is at least 15 times as great as the second surface area, preferably at least 50 times, more preferably at least 100 times.

In one aspect of this embodiment, the IR source is a semiconductor-based IR source and the first surface area is at least two times as great as the second surface area, preferably at least five times, more preferably at least ten times.

In one aspect of this embodiment, the elongate bodies are rigid and the first surface area is at least 15 times as great as the second surface area, preferably at least 50 times, more preferably at least 100 times.

In one aspect of this embodiment, the elongate bodies are flexible and the first surface area is at least two times as great as the second surface area, preferably at least five times, more preferably at least ten times.

In one embodiment, the inlets have a third surface area and the first surface area is greater than the third surface area. Preferably the first surface area is at least two times as great as the third surface area, more preferably at least five times, more preferably at least ten times, more preferably at least 100 times.

In one aspect of this embodiment, the IR source is a thermal IR source and the first surface area is at least 15 times as great as the third surface area, preferably at least 50 times, more preferably at least 100 times.

In one aspect of this embodiment, the IR source is a semiconductor-based IR source and the first surface area is at least two times as great as the third surface area, preferably at least five times, more preferably at least ten times.

In one aspect of this embodiment, the elongate bodies are rigid and the first surface area is at least 15 times as great as the third surface area, preferably at least 50 times, more preferably at least 100 times.

In one aspect of this embodiment, the elongate bodies are flexible and the first surface area is at least two times as great as the third surface area, preferably at least five times, more preferably at least ten times.

In one embodiment the IR source comprises a thermal emitter, preferably is a thermal emitter.

2. The device according to embodiment |1|, wherein the IR source comprises a semiconductor.

3. The device according to any of the preceding embodiments, wherein the IR source comprises a laser.

4. The device according to any of the preceding embodiments, wherein the IR source comprises an IR-LED.

5. The device according to any of the preceding embodiments, wherein the IR source comprises an IR semiconductor laser, preferably a vertical-cavity surface-emitting laser (VCSEL).

6. The device according to any of the preceding embodiments, wherein the IR source has one or more of the following properties:
    a. an emitter surface with an optical power flux in the range from 1 to 250 W/cm2, preferably in the range from 5 to 200 W/cm2, more preferably in the range from 10 to 150 W/cm2;
    b. a peak emission wavelength in the range from 800 to 1,600 nm, preferably in the range from 800 to 1,300 nm, more preferably in the range from 800 to 1,000 nm;
    c. a bandwidth of emission wavelength in the range from 1 to 50 nm, preferably in the range from 2 to 40 nm, more preferably in the range from 3 to 35 nm; and
    d. total power output in the range from 10 W to 100 kW, preferably in the range from 100 W to 10 kW, more preferably in the range from 300 W to 5 kW.

7. The device according to any of the preceding embodiments, wherein the IR source has one or more of the following properties:

a. an emitter surface with an optical power flux in the range from 1 to 50 W/cm2, preferably in the range from 2 to 45 cm2, more preferably in the range from 5 to 40 cm2;
b. a peak emission wavelength in the range from 800 to 1,600 nm, preferably in the range from 800 to 1,300 nm, more preferably in the range from 800 to 1,000 nm;
c. a bandwidth of emission wavelength in the range from 5 to 50 nm, preferably in the range from 10 to 45 nm, more preferably in the range from 15 to 40 nm; and
d. total power output in the range from 10 W to 100 kW, preferably in the range from 100 W to 10 kW, more preferably in the range from 300 W to 5 kW.

8. The device according to any of the preceding embodiments, wherein the IR source has one or more of the following properties:
a. an emitter surface with an optical power flux in the range from 20 to 250 W/cm2; preferably in the range from 30 to 200 W/cm2, more preferably in the range from 50 to 150 W/cm2;
b. a peak emission wavelength in the range from 800 to 1,600 nm, preferably in the range from 800 to 1,300 nm, more preferably in the range from 800 to 1,000 nm;
c. a bandwidth of emission wavelength in the range from 1 to 50 nm, preferably in the range from 2 to 30 nm, more preferably in the range from 3 to 20 nm; and
d. total power output in the range from 10 W to 100 kW, preferably in the range from 100 W to 10 kW, more preferably in the range from 300 W to 5 kW.

9. The device according to any of the preceding embodiments, wherein the IR source has one or more of the following properties:
a. an emitter surface with an optical power flux in the range from 1 to 60 W/cm2, preferably in the range from 5 to 50 W/cm2, more preferably in the range from 10 to 50 W/cm2;
b. a peak emission wavelength in the range from 800 to 3,000 nm, preferably in the range from 800 to 2,500 nm, more preferably in the range from 800 to 2,000 nm;
c. a bandwidth of emission wavelength in the range from 100 to 4,800 nm, preferably in the range from 500 to 4,000 nm, more preferably in the range from 1,000 to 3,500 nm;
d. total power output in the range from 10 W to 100 kW, preferably in the range from 25 W to 50 kW, more preferably in the range from 50 W to 10 kW; and
e. comprises an electrical insulator at a temperature in the range from 200° C. to 1,100° C. during normal operation, preferably in the range from 150° C. to 850° C., more preferably in the range from 100° C. to 650° C.

10. The device according to any of the preceding embodiments, wherein the IR source has one or more of the following properties:
a. an emitter surface with an optical power flux in the range from 1 to 250 W/cm2, preferably in the range from 5 to 200 W/cm2, more preferably in the range from 10 to 150 W/cm2;
b. a peak emission wavelength in the range 200 to 5,000 nm, preferably in the range from 600 to 3,000 nm, more preferably in the range from 800 to 2,500 nm;
c. a bandwidth of emission wavelength in the range from 1 to 4,800 nm, preferably in the range from 2 to 4,000 nm, more preferably in the range from 3 to 3,500 nm; and
d. total power output in the range from 10 W to 100 kW, preferably in the range from 100 W to 10 kW, more preferably in the range from 300 W to 5 kW.

11. The device according to any of the preceding embodiments, wherein the IR source comprises an IR source element having one or more of the following properties:
a. an emitter surface with an optical power flux in the range from 0.1 to 1,000 W/cm2, preferably in the range from 1 to 800 W/cm2, more preferably in the range from 2 to 700 W/cm2;
b. a peak emission wavelength in the range from 800 to 1,600 nm, preferably in the range from 800 to 1,300 nm, more preferably in the range from 800 to 1,000 nm;
c. a bandwidth of emission wavelength in the range from 1 to 50 nm, preferably in the range from 2 to 40 nm, more preferably in the range from 3 to 35 nm; and
d. total power output in the range from 0.001 to 15 W, preferably in the range from 0.005 to 8 W, more preferably from 0.01 to 5 W.

12. The device according to any of the preceding embodiments, wherein the IR source comprises an IR source element having one or more of the following properties:
a. an emitter surface with an optical power flux in the range from 20 to 1,000 W/cm2, preferably in the range from 30 to 800 W/cm2, more preferably in the range from 50 to 700 W/cm2;
b. a peak emission wavelength in the range from 800 to 1,600 nm, preferably in the range from 800 to 1,300 nm, more preferably in the range from 800 to 1,000 nm;
c. a bandwidth of emission wavelength in the range from 5 to 100 nm, preferably in the range from 10 to 50 nm, more preferably in the range from 15 to 40 nm; and
d. total power output in the range from 0.05 to 15 W, preferably in the range from 0.5 to 8 W, more preferably in the range from 1 to 5 W.

13. The device according to any of the preceding embodiments, wherein the IR source comprises an IR source element having one or more of the following properties:
a. an emitter surface with an optical power flux in the range from 0.1 to 20 W/cm2, preferably in the range from 1 to 18 W/cm2, more preferably in the range from 2 to 15 W/cm2;
b. a peak emission wavelength in the range from 800 to 1,600 nm, preferably in the range from 800 to 1,300 nm, more preferably in the range from 800 to 1,000 nm;
c. a bandwidth of emission wavelength in the range from 1 to 50 nm, preferably in the range from 2 to 30 nm, more preferably in the range from 3 to 20 nm; and
d. total power output in the range from 1 to 100 mW, preferably in the range from 5 to 70 mW, more preferably in the range from 10 to 50 mW.

14. The device according to any of the preceding embodiments, wherein the elongate bodies are made of a glass.

15. The device according to any of the preceding embodiments, wherein the IR radiation source comprises IR source elements corresponding one-to-one to the set of elongate bodies and wherein the light from each IR source element couples into the corresponding elongate body. In one aspect of this embodiment, an optical element is positioned between each IR source element and the corresponding elongate body.

16. The device according to any of the preceding embodiments, wherein the device is arranged and configured to provide a maximum total power output from the outlets in the range from 10 W to 10 kW, preferably in the range from 100 W to 5 kW, more preferably in the range from 500 W to 3 kW.

17. The device according to any of the preceding embodiments, wherein the device is arranged and configured to provide a maximum power output at a single outlet in the range from 0.01 to 5 W, preferably in the range from 0.1 to 4 W, more preferably in the range from 1 to 3.5 W.

18. The device according to any of the preceding embodiments, wherein the device is arranged and configured to provide heat to a target surface with an average power density in the range from 20 to 1,000 W/cm2, preferably in the range from 40 to 800 W/cm2, more preferably in the range from 60 to 700 W/cm2.

19. The device according to any of the preceding embodiments, comprising an optical element. The optical element is preferably positioned between the IR source and the inlets. The optical element is preferably one or more elements selected from the group consisting of a refractor, a collimator and a lens.

20. The device according to any of the preceding embodiments, comprising a refracting element having a refractor inlet and a refractor outlet, wherein the IR radiation decoupled from the outlet is coupled into the refracting element via the refractor inlet and decoupled from the refracting element via the refractor outlet.

21. The device according to embodiment |20|, comprising a further elongate body having a further inlet and a further outlet, wherein the IR radiation decoupled from the refracting element is coupled into the further elongate body via the further inlet and decoupled from the further elongate body at the further outlet.

22. A heat-treated target obtained by applying IR radiation to a target from a device according to any of the embodiments |1| to |21|.

23. A process for making a treated substrate, the process comprising the following steps:
   a. providing a substrate having a cavity and a target located inside the cavity;
   b. providing an IR source outside the cavity;
   c. providing a set of elongate bodies consisting of one or more elongate bodies, each elongate body having an inlet outside the cavity and an outlet inside the cavity; and
   d. transferring IR radiation emitted by the IR source to the target via the elongate bodies to obtain the heat-treated substrate.

24. The process according to embodiment |23|, wherein the treated substrate differs from the substrate in one or more ways selected from the group consisting of the following:
   a. the weight of the treated substrate is different from the weight of the substrate and, preferably, the weight of the treated substrate is less than the weight of the substrate;
   b. the shape of the treated substrate is different from the shape of the substrate; and
   c. the total surface area of the treated substrate is different from the total surface area of the substrate.

It is preferred in this embodiment that part of the substrate is removed during formation of the treated substrate, such as removal of a burr, preferably by melting or burning or both.

25. The process according to embodiment |23| or |24|, wherein the set of elongate bodies are made of a glass.

26. The process according to any of the embodiments |23| to |25|, the device comprising an optical element positioned between the IR source and one of the elongate bodies. Preferably, the device comprises one lens per IR source element positioned between the IR source element and a corresponding inlet.

27. The process according to any of the embodiments |23| to |26|, wherein the IR source emits from an emitter surface having a first surface area and the IR radiation is applied to a target surface, wherein the first surface area is greater than the target surface.

28. The process according to any of the embodiments |23| to |27|, wherein the IR radiation is applied to a target surface having a surface area per IR source element in the range from 0.0025 mm2 to 100 cm2, preferably in the range from 0.005 mm2 to 20 cm2, more preferably in the range from 0.01 mm2 to 1 cm2.

In one aspect of this embodiment, the IR radiation is applied to a target surface having a surface area per IR source element in the range from 0.0025 mm2 to 1 cm2, preferably in the range from 0.005 mm2 to 0.5 cm2, more preferably in the range from 0.01 mm2 to 0.1 cm2. It is preferred in this context for one or more of the elongate bodies in the set of elongate bodies to be flexible.

In one aspect of this embodiment, the IR radiation is applied to a target surface having a surface area per IR source element in the range from 0.1 cm2 to 100 cm2, preferably in the range from 1 cm2 to 50 cm2, more preferably in the range from 2 mm2 to 20 cm2. It is preferred in this context for one or more of the elongate bodies in the set of elongate bodies to be rigid.

29. The process according to any of the embodiments |23| to |28|, comprising a refracting element positioned between the elongate bodies and the target.

30. The process according to embodiment |12|, wherein the device comprises a further elongate body positioned between the refracting element and the target.

31. A heat-treated target obtained by a process according to one of the embodiments |23| to |30|.

32. A process for making a composite comprising the following process steps:
   a. providing a heat-treated target according to embodiment |22| or |31|; and
   b. contacting the heat-treated target with a further part to obtain the composite.

33. The process according to embodiment |32|, wherein the further part is selected from the group consisting of a metal, a metal oxide and a polymer.

34. A composite obtained by a process according to embodiment |32| or |33|.

35. A use of an IR LED array in a device for heat treating the inside of a cavity of a substrate, wherein the IR LED is located outside the cavity.

36. A use of a device according to any of the embodiments |1| to |21| for improving location selectivity of heating.

DESCRIPTION OF THE FIGURES

The invention is now further elucidated with the aid of figures. These figures are for illustrative purposes only and do not restrict the scope of the invention. The specific embodiment presented in the figures might be generalized in the following way: IR LEDs are employed as IR source elements, but other IR source elements are possible, such as IR VCSELs; Glass fibres are employed as elongate bodies, but other elongate bodies are possible, such as plastic fibers; lenses are employed as optical elements, but other optical elements are possible, such as diffraction gratings. Included are the following figures.

DETAILED DESCRIPTION OF THE INVENTION

Device

Figure 1A:
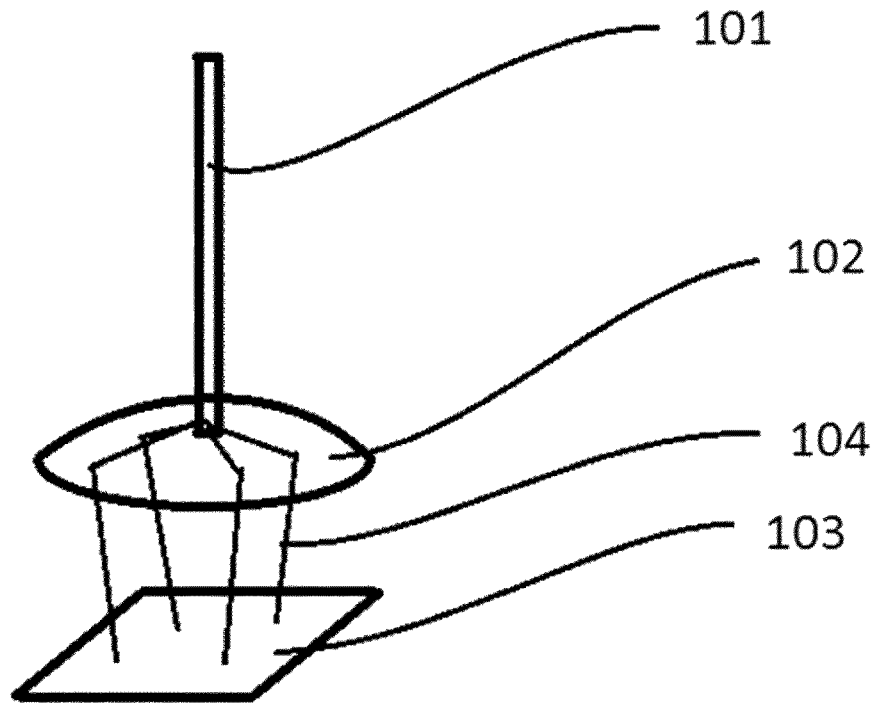
FIG. 1a is a schematic diagram showing a one-to-one relationship between an IR LED and a glass fibre.

A contribution to achieving at least one of the above-mentioned objects is made by a device for heating a target. The device comprises an IR source for providing IR radiation. IR radiation provided by the IR source is employed for heating the target. The device comprises a set of elongate bodies each having an inlet and an outlet. IR radiation from the IR source is coupled into the inlets of the elongate bodies and decoupled at the outlets of the elongate bodies. In this way, the elongate bodies provide a path for IR radiation from the IR source to be delivered at the outlets, preferably to the surface of the target. The device comprises a support for holding the outlets in a relative spatial configuration.

Elongate Bodies

The device comprises a set of elongate bodies. Preferred elongate bodies serve to convey IR radiation from the radiation source to the target. Each elongate body comprised in the set of elongate bodies has an inlet and an outlet. The inlet allows coupling of IR radiation emitted from the IR source into the elongate body. IR radiation can also be coupled into the elongate body through its side. The outlet allows decoupling of IR radiation from the elongate body. An inlet is preferably a face, more preferably a substantially flat face, most preferably a flat face. An outlet is preferably a face, more preferably a substantially flat face, most preferably a flat face. The elongate body has two ends. Preferably the inlet of an elongate body is at one end of the elongate body and the outlet of the elongate body is at the other end of the elongate body. Preferred elongate bodies are light guides.

In one embodiment, the set of elongate bodies consists of two or more, or three or more elongate bodies, preferably ten or more, more preferably 20 or more, more preferably 50 or more, more preferably 100 or more, more preferably 200 or more. The set of elongate bodies may consist of up to 10,000 elongate bodies. In one embodiment, the number of elongate bodies is in the range from 3 to 500, preferably in the range from 10 to 400, more preferably in the range from 20 to 300.

The elongate bodies preferably have a low attenuation measured at an IR peak emission wavelength of the IR source. The attenuation is preferably less than 1,000 dB/km, more preferably less than 100 dB/km, most preferably less than 20 dB/km. Attenuation might be as low as about 1 dB/km.

Preferred elongate bodies are one or more selected from the group consisting of the following: a glass rod, a glass fiber, a plastic optical fiber, a hollow silica tube, a liquid light guide, preferably a glass fiber or a glass rod.

In one embodiment, a preferred elongate body is rigid. Rigid in this context preferably means having a bending radius of at least 3 m, more preferably at least 5 m, most preferably at least 10 m. A preferred rigid elongate body is a glass rod, more preferably a quartz glass rod. A preferred rigid elongate body has a diameter in the range from 1.5 mm to 10 cm, preferably in the range from 2 mm to 5 cm, more preferably in the range from 3 mm to 2.5 cm.

In one embodiment, the elongate bodies are rigid, preferably glass rods, and the IR source is a thermal emitter.

In one embodiment, a preferred elongate body is flexible. Flexible in this context preferably means having a bending radius of less than 3 m, more preferably less than 1 m, most preferably less than 50 cm. A preferred flexible elongate body is a glass fiber, more preferably a quartz glass fiber.

In one embodiment, the elongate bodies are flexible and the IR source is a semiconductor-based IR source.

In one embodiment, one or more elongate bodies are glass fibers, preferably quartz glass fibers. Preferred glass fibers have a core diameter in the range from 5 to 1,500 µm, preferably in the range from 6 to 1,000 µm, more preferably in the range from 8 to 500 µm. A glass fiber may have a cladding, preferably making a diameter contribution in the range from 20 to 200 µm, more preferably in the range from 20 to 180 µm, most preferably in the range from 20 to 150 µm. Preferred glass fibers which comprise a core and a cladding have a numerical aperture in the range from 0.05 to 0.9, preferably from 0.1 to 0.9, more preferably from 0.2 to 0.9. The numerical aperture (NA) is given by the following formula:

$$NA = \sqrt{n_{core}^2 - n_{dad}^2}$$

in which $n_{core}$ is the refractive index of the core material and $n_{dad}$ is the refractive index of the cladding material.

Preferred materials for a cladding are one or more selected from the group consisting of glass or hard polymer, preferably glass. The preferred glass is quartz glass.

In one embodiment, one or more elongate bodies are plastic optical fibers. Preferred materials for plastic optical fibers are one or more selected from the group consisting of the following: polymethacrylate or polymethylmethacrylate. Preferred plastic optical fibers have a core diameter in the range from 200 to 3,000 µm, preferably in the range from 250 to 2,900 µm, more preferably in the range from 300 to 2,500 µm. A plastic optical fiber may have a cladding, preferably making a diameter contribution in the range from 250 to 3,050 µm, preferably in the range from 300 to 2,900 µm, more preferably in the range from 350 to 2,500 µm.

Preferred glass fibers which comprise a core and a cladding have a numerical aperture in the range from 0.05 to 0.9, preferably from 0.1 to 0.9, more preferably from 0.2 to 0.9.

In one embodiment, one or more elongate bodies are hollow silicate tubes. Preferred hollow silicate tubes have a core diameter in the range from 300 to 1,000 μm, preferably in the range from 350 to 950 μm, more preferably in the range from 400 to 900 μm. Preferred hollow silicate tubes have a cladding. The cladding may make a diameter contribution in the range from 400 to 1,300 μm, preferably in the range from 450 to 1,200 μm, more preferably in the range from 500 to 1,000 μm. The cladding is preferably an aluminium halide or silver halide.

Preferred glass fibers which comprise a core and a cladding have a numerical aperture in the range from 0.05 to 0.9, preferably from 0.1 to 0.9, more preferably from 0.2 to 0.9.

In one embodiment, one or more elongate bodies are liquid light guides. Preferred liquid light guides have a core diameter in the range from 3,000 to 5,000 μm, preferably in the range from 3,300 to 4,700 μm, more preferably in the range from 3,500 to 4,500 μm. A glass fiber may have a cladding, preferably making a diameter contribution in the range from 6,000 to 10,000 μm, more preferably in the range from 6,500 to 9,500 μm, most preferably in the range from 7,000 to 9,000 μm. Preferred glass fibers have a numerical aperture in the range from 0.05 to 0.9, preferably from 0.1 to 0.9, more preferably from 0.2 to 0.9.

The set of elongate bodies may be gathered together into a bundle over at least part of the length of the elongate bodies.

Support

The device may comprise a support for holding the outlets in a fixed relative position.

Outlet Surface and Emitter Surface

The relative configuration of the outlets defines an outlet surface, wherein the outlets lie within the outlet surface.

The emitter surface of the IR source is the surface over which the IR source emits IR radiation. Where the IR source consists of a single IR source element, the emitter surface of the IR source is simply the area over which the IR source element emits IR radiation. Where the IR source consists of a plurality of IR source elements, the emitter surface of the IR source is the surface defined by the IR source elements, wherein the IR source elements lie within the emitter surface of the IR source. The emitter surface of the IR source is a single connected area having a perimeter defined by the outermost IR source elements, which lie on the perimeter.

The outlets lie within the outlet surface and there may be gaps in the outlet surface between the area occupied by the outlets. IR radiation is provided from the proportion of the outlet surface which is occupied by outlets. In one embodiment, the outlets are densely packed. It is preferred in this embodiment for the IR radiation to be provided from a proportion of the outlet surface in the range from 0.1 to 0.9, preferably in the range from 0.2 to 0.9, and more preferably in the range from 0.3 to 0.9.

Arrangement of IR Source and Elongate Bodies

A number of arrangements of the IR source and the set of elongate bodies are possible within the scope of the invention. Such arrangements are determined by the relationship between the individual elongate bodies which make up the set of elongate bodies and the individual IR source elements which make up the IR source.

The relationship between individual IR source elements and individual elongate bodies can be one-to-one, many-to-one, one-to-many, many-to-many, or mixed. In a one-to-one relationship, a single IR source element is arranged in correspondence with a single elongate body. The IR radiation emitted from the IR source element couples predominantly, preferably substantially exclusively, more preferably exclusively into the elongate body. The light coupled into the elongate body is coupled predominantly, preferably substantially exclusively, more preferably exclusively from the IR source element. In a many-to-one relationship, a grouping of two or more IR source elements is arranged in correspondence with a single elongate body. The IR radiation emitted from the grouping of IR source elements couples predominantly, preferably substantially exclusively, more preferably exclusively into the elongate body. The light coupled into the elongate body is coupled predominantly, preferably substantially exclusively, more preferably exclusively from the group of IR source elements. In a one-to-many relationship, a single IR source element is arranged in correspondence with a grouping of two or more elongate bodies. The IR radiation emitted from the IR source element couples predominantly, preferably substantially exclusively, more preferably exclusively into the grouping of elongate bodies. The light coupled into the grouping of elongate bodies is coupled predominantly, preferably substantially exclusively, more preferably exclusively from the IR source element. In a many-to-many relationship, a grouping of two or more IR source elements is arranged in correspondence with a grouping of two or more elongate bodies. The IR radiation emitted from the grouping of IR source elements couples predominantly, preferably substantially exclusively, more preferably exclusively into the grouping of elongate bodies. The light coupled into the grouping of elongate bodies is coupled predominantly, preferably substantially exclusively, more preferably exclusively from the grouping of IR source elements. Mixed relationships between IR source elements and elongate bodies which are not fully described by a one-to-one, one-to-many, many-to-one or many-to-many relationship are also possible.

In one embodiment of the invention, the IR source elements of the IR source and the elongate bodies of the set of elongate bodies are arranged in one-to-one relationships. Each IR source element corresponds one-to-one with a corresponding elongate body.

In one embodiment of the invention, the IR source elements of the IR source and the elongate bodies of the set of elongate bodies are arranged in one-to-many relationships. Each IR source element corresponds one-to-many with a corresponding grouping of elongate bodies.

In one embodiment of the invention, the IR source elements of the IR source and the elongate bodies of the set of elongate bodies are arranged in one-to-many relationships. Each IR source elements belongs to a grouping of two or more IR source elements which corresponds many-to-one with a corresponding elongate body.

In one embodiment of the invention, the IR source elements of the IR source and the elongate bodies of the set of elongate bodies are arranged in many-to-many relationships. Each IR source element belongs to a grouping of two or more IR source elements which corresponds many-to-many with a corresponding grouping of elongate bodies.

In one embodiment of the invention, IR source elements of the IR source and the elongate bodies of the set of elongate bodies are arranged to include two different types of relationship selected from the group consisting of the following: one-to-one, one-to-many, many-to-one, many-to-many and mixed.

IR Source

The device comprises an IR source. Preferred IR sources serve to provide IR radiation for heating the target surface. IR radiation from the IR source is conveyed to the target by the set of elongate bodies.

The IR source may be a single IR source element or may consist of a collection of IR source elements. An IR source element emits radiation from a single connected area. An IR source which emits radiation from more than one connected area consists of more than one IR source element.

An IR source element may be selected by the skilled person depending on its suitability in the context of the present invention.

In one embodiment, the IR source comprises a semiconductor IR emitter. Semiconductor IR emitters are also referred to as IR diode emitters. A semiconductor IR emitter is arranged and configured to emit IR radiation from a semiconductor part. Preferred semiconductor IR emitters harness a semiconductor bandgap to emit radiation at a wavelength which depends on the width of the semiconductor bandgap. Preferred types of semiconductor IR emitters are IR LEDs and IR semiconductor lasers.

In one embodiment, the device comprises an IR source element having a peak emission wavelength in the range from 790 to 830 nm, preferably in the range from 800 to 820 nm, more preferably in the range from 805 to 815 nm, the IR source element preferably being an IR LED.

In one embodiment, the device comprises an IR source element having a peak emission wavelength in the range from 830 to 870 nm, preferably in the range from 840 to 860 nm, more preferably in the range from 845 to 855 nm, the IR source element preferably being an IR LED.

In one embodiment, the device comprises an IR source element having a peak emission wavelength in the range from 920 to 960 nm, preferably in the range from 930 to 950 nm, more preferably in the range from 935 to 945 nm, the IR source element preferably being an IR LED.

In one embodiment, the device comprises an IR source element having a peak emission wavelength in the range from 950 to 990 nm, preferably in the range from 960 to 980 nm, more preferably in the range from 965 to 975 nm, the IR source element preferably being an IR VCSEL.

In one embodiment, the device comprises an IR source element having a peak emission wavelength in the range from 960 to 1,000 nm, preferably in the range from 970 to 990 nm, more preferably in the range from 975 to 985 nm, the IR source element preferably being an IR VCSEL.

In one embodiment, the IR source comprises a thermal IR emitter, preferably is a thermal IR emitter.

In one embodiment, the device comprises an IR source element having a peak emission wavelength in the range from 0.8 to 3 µm, preferably in the range from 1 to 2.5 µm, more preferably in the range from 1.25 to 2 µm, the IR source element preferably being a thermal IR emitter.

Optical Elements

The device may comprise one or more optical elements. Preferred optical elements serve to alter the path of IR radiation emitted from the IR source. In particular an optical element can be employed for one or more of the following: adjusting coupling, preferably coupling into an elongate body; adjusting decoupling, preferably decoupling from an elongate body; focusing; divergence and collimation. The skilled person may employ an optical element considered suitable in the context of the invention. Preferred optical elements are selected from the group consisting of the following: a lens; a collimator; a diffractor, preferably a diffraction grating.

In one embodiment, the device of the invention comprises an optical element for increasing the proportion of IR radiation emitted from an IR source element which is coupled into the elongate bodies.

Coupling

IR radiation couples into the elongate bodies at the inlets and decouples from the elongate bodies at the outlets. An inlet may be in contact with either an IR source element or an optical element or neither.

Coupling of IR radiation from the IR source into the inlets of the set of elongate bodies may be achieved either with the inlets in contact with the IR source or with the inlets at a distance from the IR source. A preferred distance between the inlet of an elongate body and the IR source is in the range from 1 mm to 1 cm, preferably 1 mm to 5 mm, more preferably 1 mm to 3 mm.

In one embodiment, one or more elongate bodies are in direct contact with the IR source. Direct contact between elongate bodies with the IR source may be a mere resting contact or may be attachment. A preferred attachment is welding or insertion or both. In one aspect of this embodiment, a set of elongate bodies, preferably all of the elongate bodies, and a set of IR source elements, preferably all of the IR source elements, are contacted in one-to-one relationships. In one aspect of this embodiment, a set of elongate bodies, preferably all of the elongate bodies, and a set of IR source elements, preferably all of the IR source elements, are contacted in one-to-many relationships. In one aspect of this embodiment, a set of elongate bodies, preferably all of the elongate bodies, and a set of IR source elements, preferably all of the IR source elements, are contacted in many-to-one relationships.

In one embodiment, one or more elongate bodies are in direct contact with one or more optical elements. Direct contact between elongate bodies and optical elements may be a mere resting contact or may be attachment. A preferred attachment is welding or insertion or both. In one aspect of this embodiment, a set of elongate bodies, preferably all of the elongate bodies, and a set of optical elements, preferably all of the optical elements, are contacted in one-to-one relationships. In one aspect of this embodiment, a set of elongate bodies, preferably all of the elongate bodies, and a set of optical elements, preferably all of the optical elements, are contacted in one-to-many relationships. In one aspect of this embodiment, a set of elongate bodies, preferably all of the elongate bodies, and a set of optical elements, preferably all of the optical elements, are contacted in many-to-one relationships.

In one embodiment, one or more elongate bodies are positioned at a distance from the IR source. In one aspect of this embodiment, a set of elongate bodies, preferably all of the elongate bodies, and a set of IR source elements, preferably all of the IR source elements, are at a distance in corresponding one-to-one relationships. In one aspect of this embodiment, a set of elongate bodies, preferably all of the elongate bodies, and a set of IR source elements, preferably all of the IR source elements, are at a distance in corresponding one-to-many relationships. In one aspect of this embodiment, a set of elongate bodies, preferably all of the elongate bodies, and a set of IR source elements, preferably all of the IR source elements, are at a distance in corresponding many-to-one relationships.

In one embodiment, one or more elongate bodies are positioned at a distance from one or more optical elements. In one aspect of this embodiment, a set of elongate bodies, preferably all of the elongate bodies, and a set of optical elements, preferably all of the optical elements, are at a distance in corresponding one-to-one relationships. In one aspect of this embodiment, a set of elongate bodies, preferably all of the elongate bodies, and a set of optical elements, preferably all of the optical elements, are at a distance in corresponding one-to-many relationships. In one aspect of this embodiment, a set of elongate bodies, preferably all of the elongate bodies, and a set of optical elements, preferably all of the optical elements, are at a distance in corresponding many-to-one relationships.

Technological Applications

The device and the process of the invention are useful for heating a target, especially a target surface which is difficult to access. One application of the invention is for treating molded parts, preferably molded plastic parts. A preferred treatment of molded parts is the removal of molding burrs. The invention may be employed for heating one or more selected from the group consisting of the following: a plastic, silicon, a metal, an inorganic compound and a composite. Preferred thermoplastics are one or more selected from the group consisting of the following: acrylonitrile butadiene styrene co-polymer, polyacrylate, a polylactide, polymethyl methacrylate, polycarbonate, polyethylene terephthalate, polyethylene, polypropylene, polystyrene, polyetherketone and polyvinylchloride. Preferred inorganic compounds are ZnO or SiC.

Another application of the invention is for making a composite item from two or more parts. The device or the process of the invention or both can be employed for heating a target surface to soften or melt it. A further part is then welded to the softened or melted target surface.

FIG. 1a is a schematic diagram showing a one-to-one relationship in which a single IR source element such as an IR LED 103 corresponds with a single elongate body such as a glass fiber 101. IR radiation 104 emitted from the IR LED 103 is coupled into the inlet of the glass fiber 101 via an optical element such as a lens 102. The IR radiation 104 emitted from the IR LED 103 couples only into the glass fiber 101, not into any other glass fibers. Only IR radiation from the IR LED 103 is coupled into the glass fiber 101, not IR radiation from any other IR LEDs.

Figure 1B:
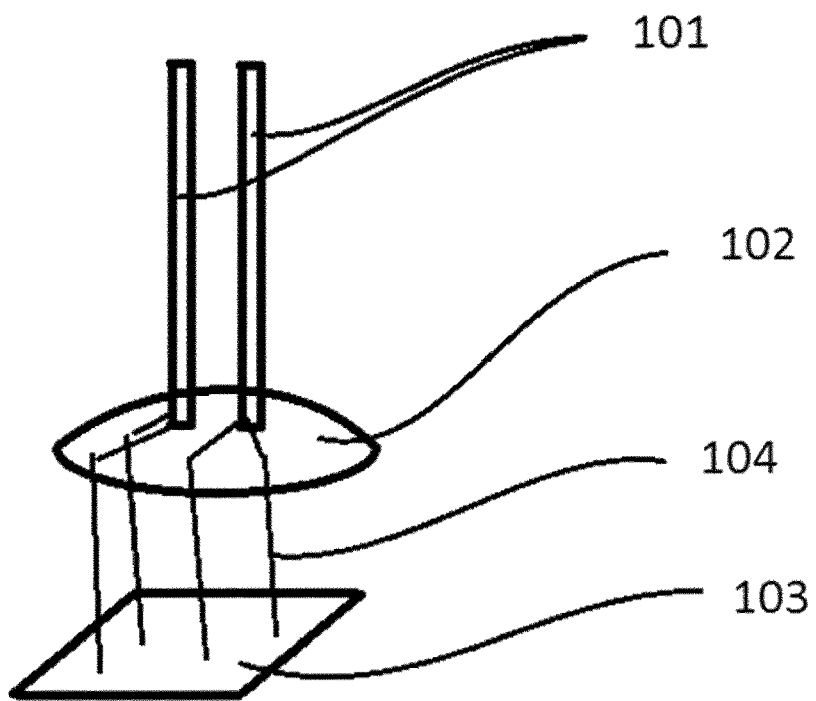
FIG. 1b is a schematic diagram showing a many-to-one relationship between a grouping of IR LEDs and a glass fibre.

FIG. 1b is a schematic diagram showing a one-to-many relationship in which a single IR LED 103 corresponds with a grouping of two glass fibers 101. IR radiation 104 emitted from the IR LED 103 is coupled into the inlets of the grouping of glass fibers 101 via the lens 102. The IR radiation 104 emitted from the IR LED 103 couples only into the grouping of glass fibers 101, not into any other glass fibers. Only IR radiation from the IR LED 103 is coupled into the grouping of glass fibers 101, not IR radiation from any other IR LEDs.

Figure 1C:
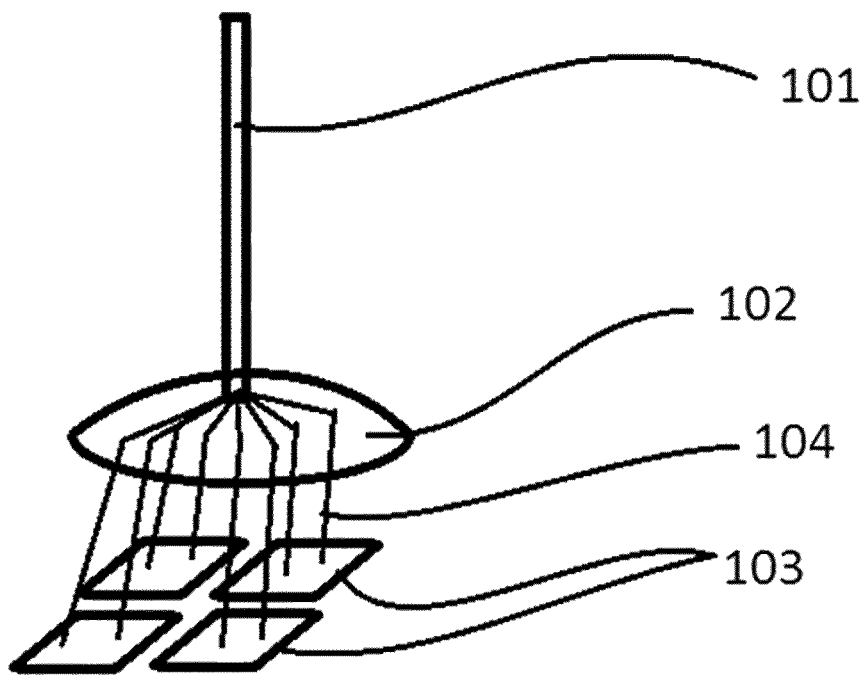
FIG. 1c is a schematic diagram showing a one-to-many relationship between an IR LED and a grouping of glass fibres.

FIG. 1c is a schematic diagram showing a many-to-one relationship in which a grouping of four IR LEDs 103 corresponds with a single glass fiber 101. IR radiation 104 emitted from the grouping of IR LEDs 103 is coupled into the inlet of the glass fiber 101 via the lens 102. The IR radiation 104 emitted from the grouping of IR LEDs 103 couples only into the glass fiber 101, not into any other glass fibers. Only IR radiation from the grouping of IR LEDs 103 is coupled into the glass fiber 101, not IR radiation from any other IR LEDs.

Figure 1D:
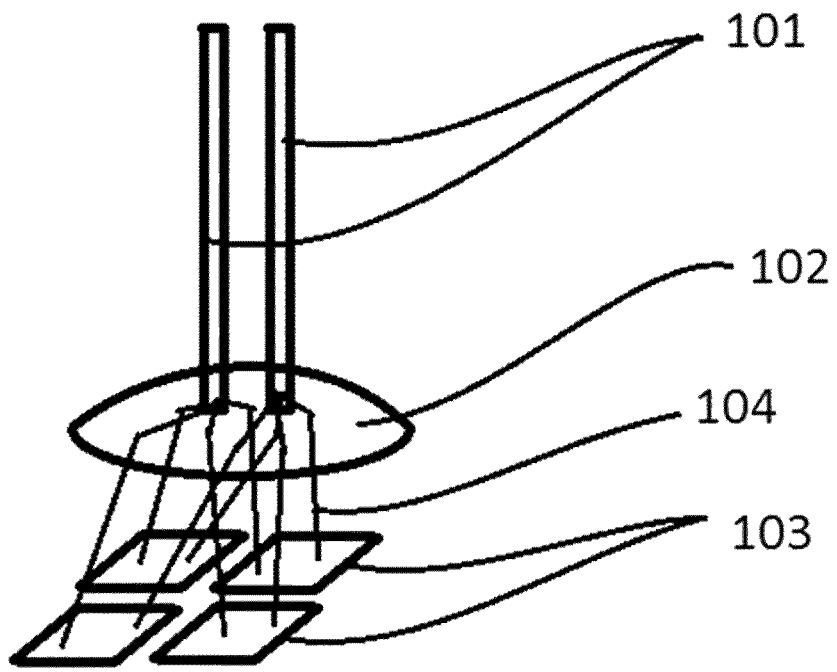
FIG. 1d is a schematic diagram showing a many-to-many relationship between a grouping of IR LEDs and a grouping of glass fibers.

FIG. 1d is a schematic diagram showing a many-to-many relationship in which a grouping of four IR LEDs 103 corresponds with a grouping of two glass fibers 101. IR radiation 104 emitted from the grouping of IR LEDs 103 is coupled into the inlets of the grouping of glass fibers 101 via the lens 102. The IR radiation 104 emitted from the grouping of IR LEDs 103 couples only into the grouping of glass fibers 101, not into any other glass fibers. Only IR radiation from the grouping of IR LEDs 103 is coupled into the grouping of glass fibers 101, not IR radiation from any other IR LEDs.

Figure 1E:
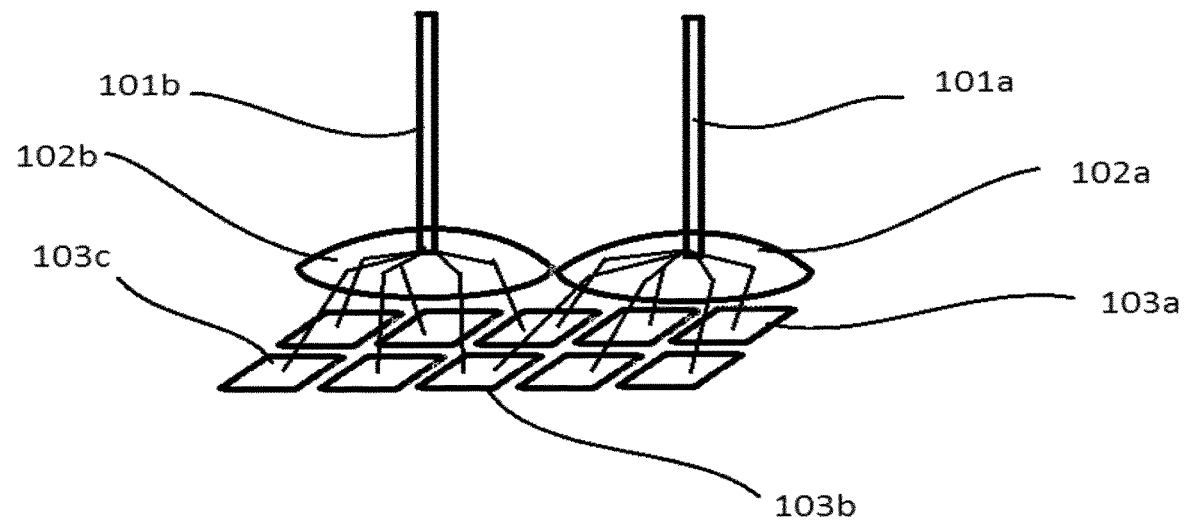
FIG. 1e is a schematic diagram showing a mixed relationship between IR LEDs and glass fibers.

FIG. 1e is a schematic diagram showing a mixed relationship between six IR LEDs 103 and two glass fibers 101. IR radiation 104 emitted from the four IR LEDs on the left 103c is coupled into the left glass fiber 101b via the lens 102b. IR radiation 104 emitted from the four IR LEDs on the right 103a is coupled into the right glass fiber 101a via the lens 102a. IR radiation 104 emitted from the two IR LEDs in the center 103b is coupled into both the right glass fiber 101a via the lens 102a and the left glass fiber 101b via the lens 102b. The left glass fiber 101b receives IR radiation from both the four IR LEDs on the left 103c and the two IR LEDs in the center 103b. The right glass fiber 101a receives IR radiation from both the four IR LEDs on the right 103a and the two IR LEDs in the center 103b. The relationship between the IR LEDs 103 and the glass fibers 101 here cannot be described as any of the following: one-to-one, one-to-many, many-to-one or many-to-many.

Figure 2:
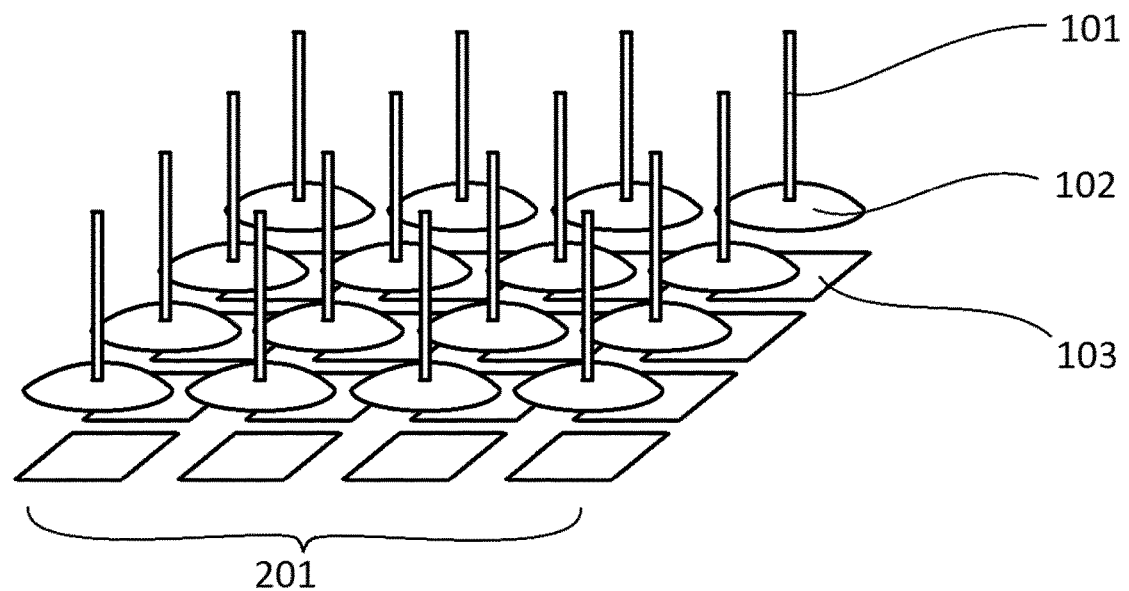
FIG. 2 is a schematic diagram showing an array of IR LEDs corresponding one-to-one with a set of glass fibers.

FIG. 2 is a schematic diagram showing an array 201 of IR LEDs 103 corresponding one-to-one with a set of glass fibers 101. The IR LEDs 103 are together considered to be the IR source. Each IR LED 103 is in one-to-one correspondence with a corresponding glass fiber 101. IR radiation 104 from each IR LED 103 is coupled to the corresponding glass fiber 101 via a lens 102.

Figure 3:
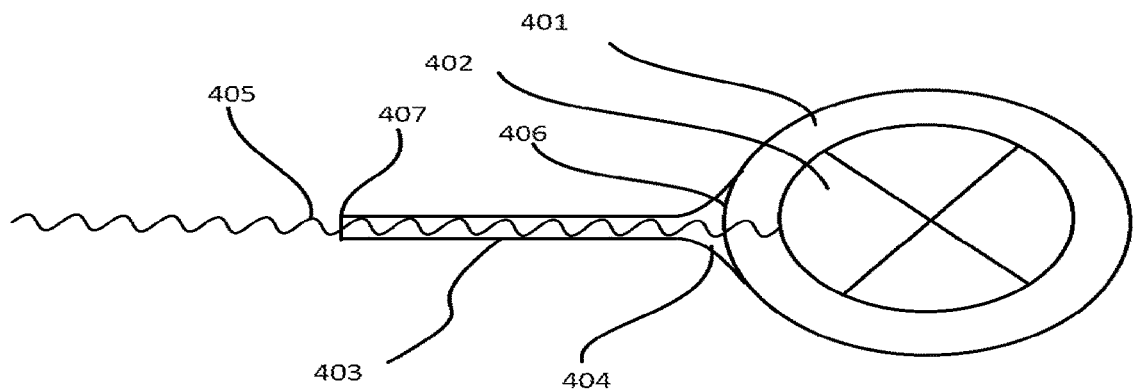
FIG. 3 is a schematic diagram showing a thermal emitter which has a glass rod welded to it.

FIG. 3 is a schematic diagram showing a thermal IR source such as a thermal emitter 402 having a glass coating 401 which has a glass rod 403 welded to it at a weld 404. IR radiation 405 passes from the thermal emitter 402 into the glass rod 403 via an inlet 406 and out of the glass rod 403 via an outlet 407.

Figure 4:
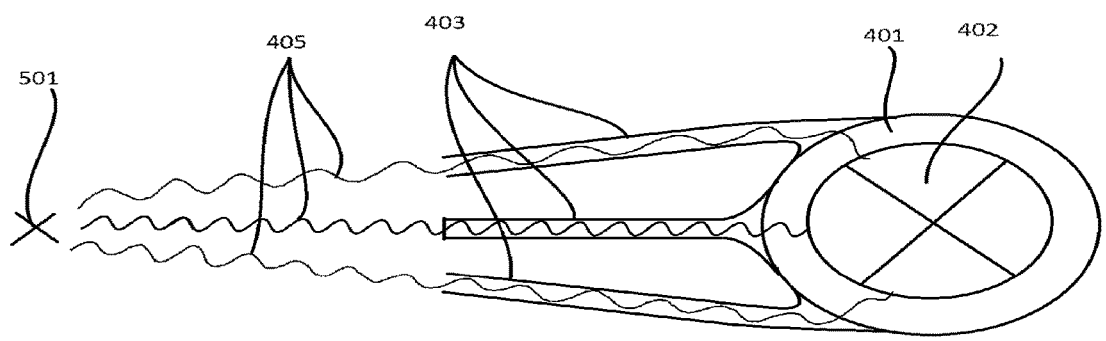
FIG. 4 is a schematic diagram showing a thermal emitter having three glass rods welded to it.

FIG. 4 is a schematic diagram showing the thermal emitter 402 having the glass coating 401 which has three glass rods 403 welded to it. IR radiation 405 passes from the thermal emitter 402 into the glass rods 403 and intersects at a target 501.

Figure 5:
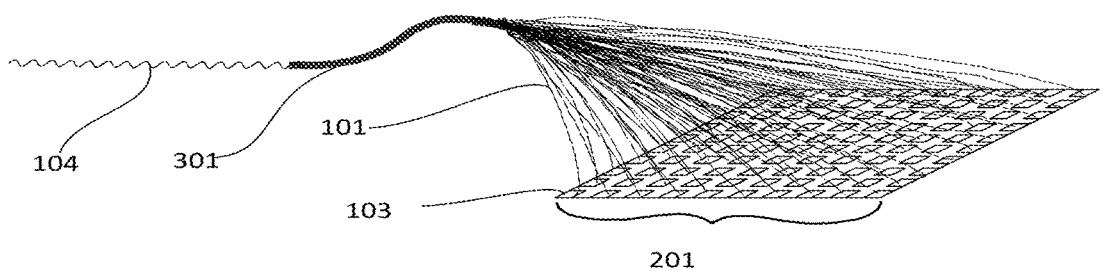
FIG. 5 is a schematic diagram showing an array of IR LEDs coupled one-to-one to glass fibers.

FIG. 5 is a schematic diagram showing the array 201 of IR LEDs 103 coupled one-to-one to glass fibers 101. The glass fibers 101 are grouped into a bundle 301. IR radiation 104 from the IR LEDs 103 is conducted via the glass fibers 101 and exits from the end of the fiber bundle 301.

Figure 6:
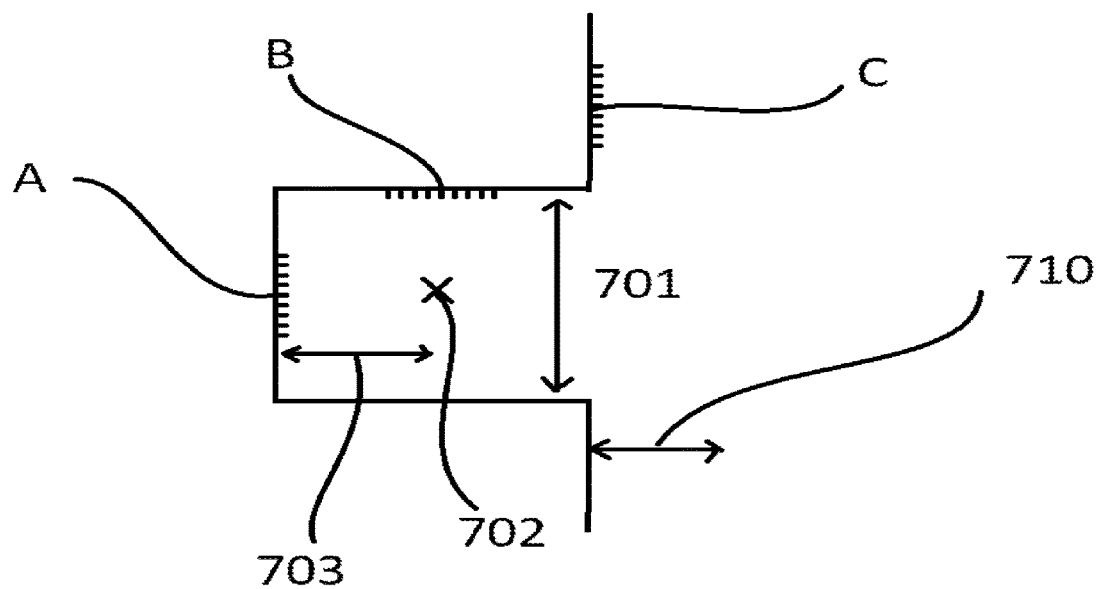
FIG. 6 shows schematically the surface of a test substrate.

FIG. 6 shows schematically the surface of a test substrate 901. The surface has a cubic cavity 902 with sides separated by a distance 701 of 10 mm. A testing point A is at the midpoint of the back-interior face, point B is the midpoint of a side face of the cavity 902 and point C is on the exterior face of the test substrate 901 a distance of 5 mm from the cavity 902. For an elongate body, the outlet surface (e.g., tip of glass rod) is positioned at a point 702 which is a distance 703 of 5 mm from the back face of the cavity 902. For a non-elongate emitter, the emitter is located a distance 710 of 5 mm from the exterior substrate surface. At each of A, B and C, the surface of the test substrate 901 has ridges as shown in FIG. 7.

Figure 7:
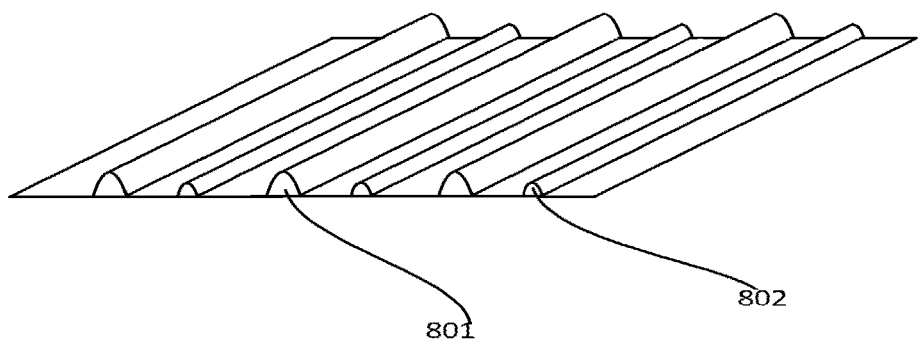
FIG. 7 shows schematically the surface of the test substrate of FIG. 6.

FIG. 7 shows schematically the surface of the test substrate 901 of FIG. 6 at each of the test locations A, B and C. The test surface at those locations has a series of ridges 801 of height 0.5 mm and ridges 802 of height 0.2 mm.

Figure 8:
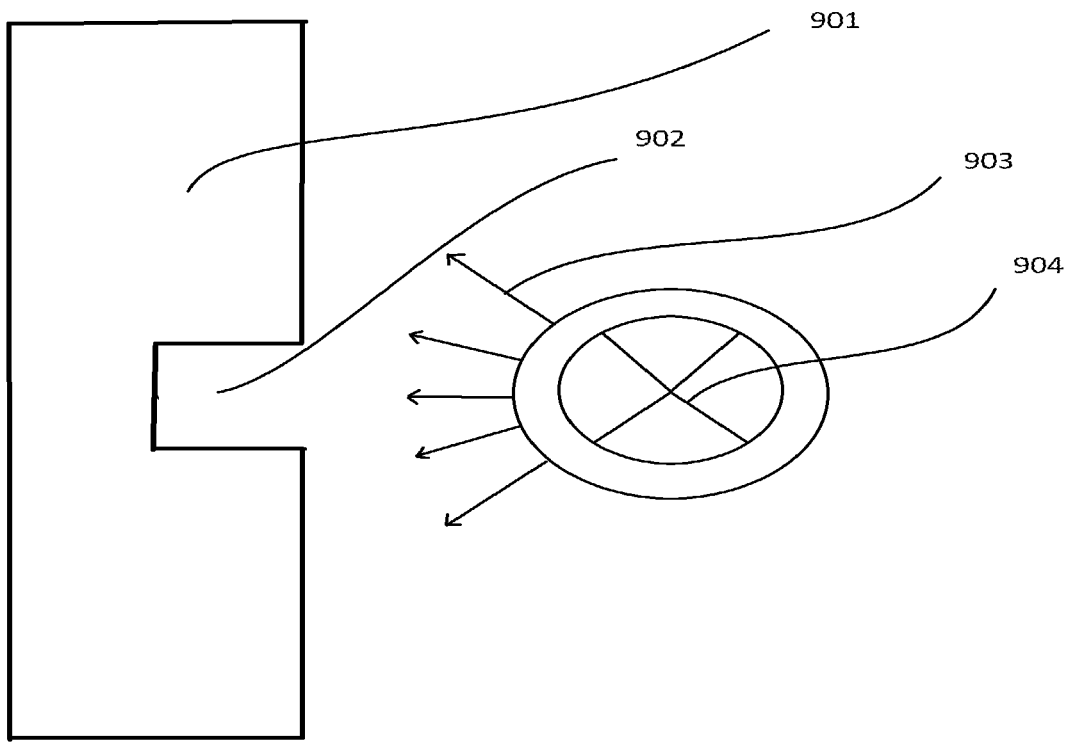
FIG. 8 shows schematically a thermal IR emitter being used to apply radiation to the test substrate.

FIG. 8 shows schematically an IR thermal emitter 904 being used to apply radiation 903 to the test substrate 901 of FIGS. 6 and 7. The thermal emitter 401 is too large to enter the cavity 902.

Figure 9:
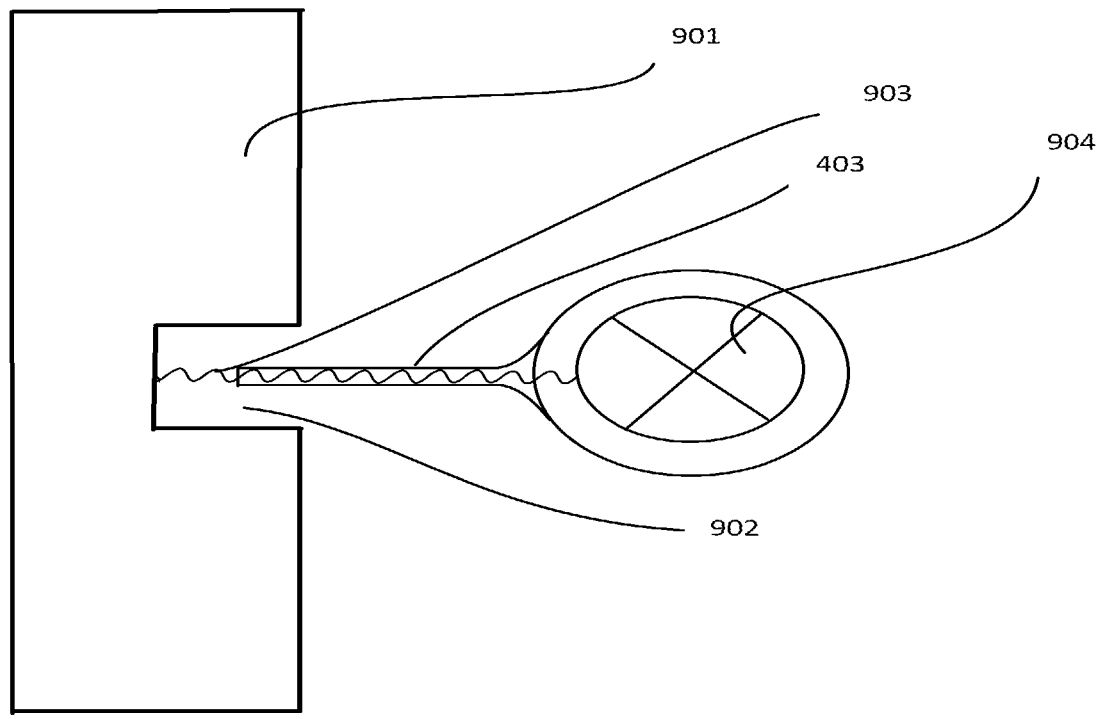
FIG. 9 shows the device of FIG. 4 used to apply radiation to the test substrate.

FIG. 9 shows the device of FIG. 4, being a glass rod 403 welded to the IR thermal emitter 904, used to apply radiation 903 to the cavity 902 of the test substrate 901 of FIG. 6. The end of the glass rod 403 can reach into the cavity 902 to apply IR radiation 903.

Figure 10:
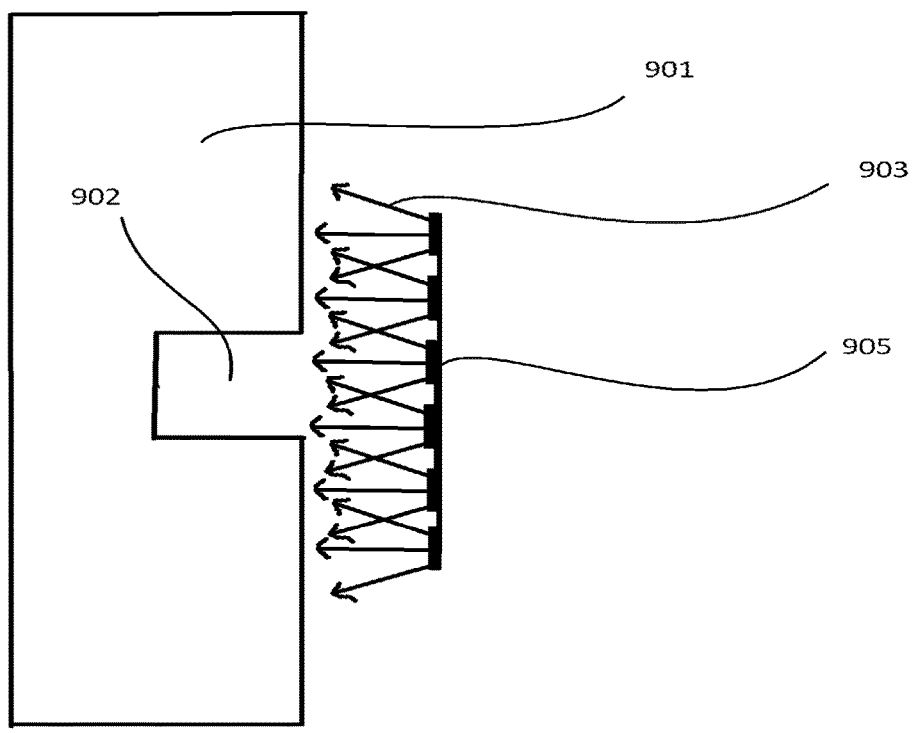
FIG. 10 shows an array of IR LEDs employed for applying radiation to the test substrate.

FIG. 10 shows an array of IR LEDs 905 employed for applying radiation 903 to the cavity 902 of the test substrate 901 of FIG. 6. The array 905 cannot fit inside the cavity 902 of the test substrate 901.

Figure 11:
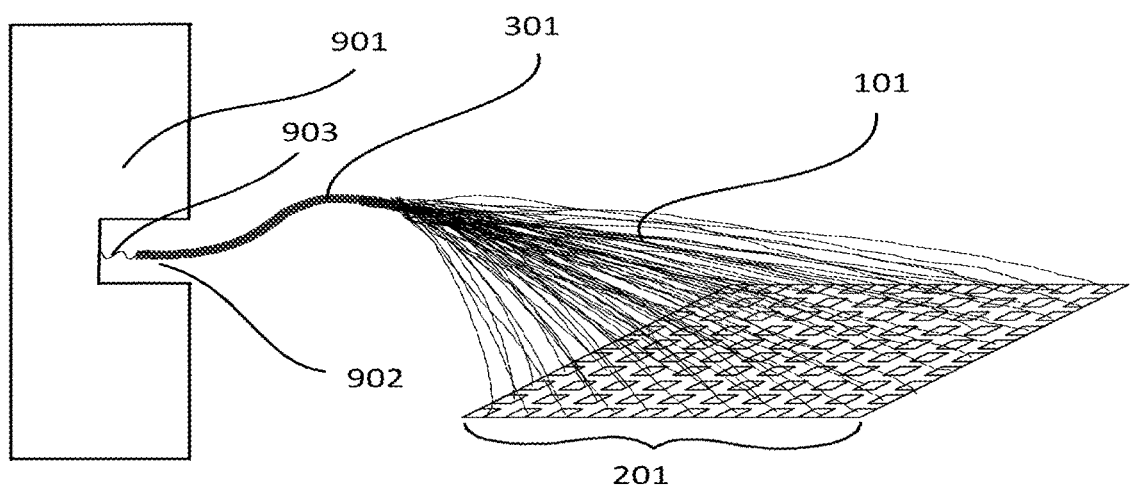
FIG. 11 shows an array of IR LEDs coupled to a bundle of glass fibers employed for applying radiation to the test substrate.

FIG. 11 shows the array 201 of IR LEDs coupled to the bundle 301 of glass fibers 101, employed for applying radiation 903 to the cavity 902 of the test substrate 901 of FIG. 6. The end of the fiber bundle 301 is small enough to enter into the cavity 902 to apply IR radiation 903 to its inside.

Figure 12:
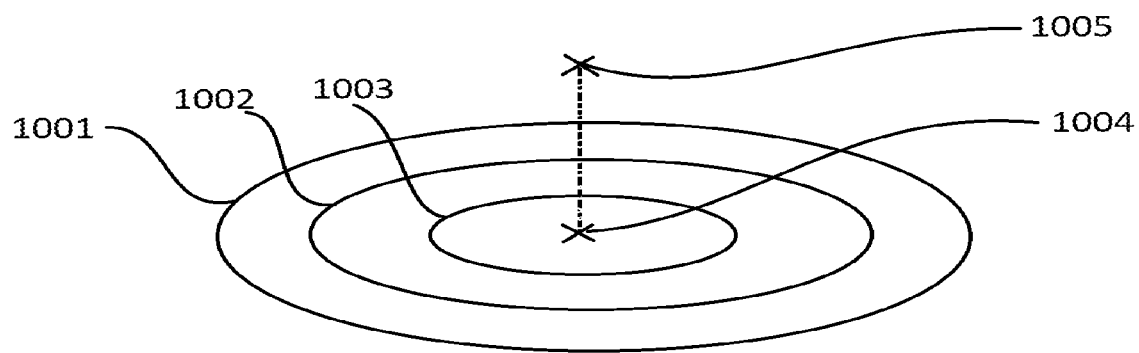
FIG. 12 shows a test surface.

FIG. 12 shows a flat target surface. For the examples, the outlet of the emitter was placed at a point 1005 separated by 5 mm above a point 1004 on the target surface. For larger outlet surfaces, the midpoint of the outlet surface was located at the point 1005. Following irradiation, temperature measurements were made at the point 1004 and on an inner ring 1003, a middle ring 1002 and an outer ring 1001 spaced 5 mm, 10 mm and 15 mm respectively from the point 1004.

Test Methods

Optical Power Flux

Optical power flux is measured according to CIE 84-1989.

Peak Emission Wavelength and Bandwidth

Peak emission wavelength and bandwidth are measured according to CIE 63-1984.

Peak emission wavelength is at a maximum in the spectral emission density. Bandwidth is the width of the distribution about the peak emission wavelength for which spectral emission density is greater than or equal to half the peak value.

Temperature at Target Surface

Temperature is measured according to DIN IEC 60584.

Adhesion

Adhesion is measured using the tape test of ASTM D3359-17 using a ranking from 1 to 5, where 1 is the poorest performing and 5 is the best performing.

EXAMPLES

The following examples describe how the invention may be put into practice. The examples are not exhaustive and do not represent a limit on the scope of the claimed invention.

Example 1a

A device is provided according to FIGS. 2 and 5. As IR source a 5 by 5 square array of IR LEDs commercially available from the company Osram Opto Semiconductors GMbH of Germany having the following properties was employed: emitter peak wavelength=940 nm, emission wavelength bandwidth=100 nm, optical flux=10 W/cm$^2$, emitting area=1 mm$^2$. The square array had a spacing between adjacent IR LEDs of 2.5 mm. The array therefore had an overall size of 15 mm by 15 mm. Over each IR LED was positioned a circular collimating lens commercially available from the company Heraeus Noblelight GmbH of Germany having a cross sectional diameter of 1.25 mm. Each lens was at a distance of 1 mm from the corresponding IR LED with the flat side directed towards the IR LED. A quartz glass fiber with a numerical aperture of 0.37 commercially available from the company Laser Components GmbH of Germany having the following properties was positioned with one end 1 mm from the curved surface of each lens: length=5 m, core diameter=0.8 mm, cladding material=hard polymer, coating diameter contribution=0.1 mm. The other ends of the glass fiber were tightly bundled and held together by a tape to give an outlet surface area of 18 mm$^2$. The outlet surface was brought into proximity to a target substrate made of acrylonitrile butadiene styrene as shown in FIGS. 6 and 7. It was introduced into the cavity at a distance of 5 mm from the back face as shown in FIG. 12. IR radiation was applied to the target surface for 5 seconds by activating the IR LED array. The ratio of the emitter surface area to the surface area of the outlet surface was thus 13:1.

Example 1b

A device is provided according to FIG. 3. As IR source a thermal emitter commercially available from the company Heraeus Noblelight GmbH of Germany having the following properties was employed: emitter peak wavelength=1,250 nm, emission wavelength bandwidth=3,000 nm, optical flux=10 W/cm$^2$, emitting area of 30×25 mm$^2$. A quartz glass staff with a numerical aperture of 0.9 commercially available from the company Heraeus Quarzglas GmbH of Germany having the following properties was welded with one end to the surface of the insulating material of the thermal emitter: length=10 cm and core diameter=5 mm. The outlet surface was brought into proximity to the target substrate according to FIGS. 6 and 7 made of acrylonitrile butadiene styrene. It was introduced into the cavity at a distance of 5 mm from the back face as shown in FIG. 10. IR radiation was applied to the target surface for 5 seconds by activating the thermal emitter. The ratio of emitter surface area to inlet surface area was thus 38:1 and the ratio of emitter surface area to outlet surface area was also 38:1.

Example 2a

Example 1a was repeated except that the array was employed without the glass fibers coupled. The array was positioned 5 mm from the target substrate exterior surface as shown in FIG. 10. IR radiation was likewise applied to the target surface for 5 seconds by activating the IR LED array.

Example 2b

Example 1b was repeated except that the thermal emitter was employed without the attached glass rod. The thermal emitter was positioned 5 mm from the target substrate exterior surface as shown in FIG. 8. IR radiation was likewise applied to the target surface for 5 seconds by activating the thermal emitter.

Measurements

In each case, the target substrate was subsequently inspected at positions A, B and C to see whether the ridges were still identifiable or whether they had been melted away. Also, the larger scale integrity of the structure was inspected.

TABLE 1

| Example | A | B | C | Large Scale Structure |
|---------|---|---|---|----------------------|
| 1a | 2 | 0 | 0 | No impairment |
| 1b | 2 | 1 | 0 | No impairment |
| 2a | 0 | 0 | 2 | Exterior corners rounded slightly |
| 2b | 2 | 2 | 2 | Substantial modification of structure with external and internal corners rounded |

Key:
0=both small ridges and large ridges identifiable post heating
1=small ridges not identifiable but large ridges identifiable post heating 2=neither small ridges nor large ridges identifiable post heating As is evident from Table 1, the inventive Examples 1a and 1b both allowed selective heating and removal of the ridges at A at the far end of the cavity without impairing the ridges at C. In Example 1a the ridges on the side of the cavity B were also untouched. In Example 1b, there was some melting of the ridges at B. In both of the comparative Examples 2a and 2b, heating at position A in the cavity could not be achieved without impairing the external surface at C. There was also an impairment of the large-scale structure of the substrate in the comparative examples.

Examples 3a-4b

Examples 1a, 1b, 2a, and 2b were repeated, but with a target according to FIG. 12. In each case, the emitter outlet was positioned 5 mm from the center point of the target. Measurements of temperature were taken on the concentric rings once the temperature at the center point reached 150° C.

TABLE 2

| Example | Temp. at center [° C.] | Temp. on ring 1 [° C.] | Temp. on ring 2 [° C.] | Temp. on ring 3 [° C.] |
| --- | --- | --- | --- | --- |
| 3a | 150 | 30 | 25 | 25 |
| 3b | 150 | 40 | 25 | 25 |
| 4a | 150 | 130 | 80 | 50 |
| 4b | 150 | 150 | 140 | 130 |

As is evident from Table 2, the inventive Examples 3a and 3b provided a better selective heating at the center of the target than the corresponding comparative Examples 4a and 4b, respectively.

Example 5

The devices of Examples 1a and 1b were employed in the following manner: The glass fibers of Example 1a were bent to achieve an arc of angle α with a bending radius r. The glass rod of Example 2a was heated and worked into an arc of angle α with a bending radius r. Results are shown in Table 3. Outlet power is normalized to the corresponding example without angular deviation.

TABLE 3

| Example | Elongate body | Angle α [°] | Bending radius r [cm] | Outlet power (normalized) | Observations |
| --- | --- | --- | --- | --- | --- |
| 5a - 1 | Glass fibres | 0 | Na | 1 | Flexible fibers had to be held in position with clamps |
| 5a - 2 | Glass fibres | 30 | 30 | 1 | Flexible fibers had to be held in position with clamps |
| 5a - 3 | Glass fibres | 60 | 20 | 1 | Flexible fibers had to be held in position with clamps |
| 5a - 4 | Glass fibres | 90 | 10 | 0.2 | The fibers broke |
| 5b - 1 | Glass rod | 0 | Na | 1 | The formed glass rod held its position |
| 5b - 2 | Glass rod | 30 | 30 | 1 | The formed glass rod held its position |
| 5b - 3 | Glass rod | 60 | 20 | 1 | The formed glass rod held its position |
| 5b - 4 | Glass rod | 90 | 10 | 0.8 | The formed glass rod held its position |

Due to their flexibility, the glass fibers had to be held in position with clamps. The bulkiness of the clamps and flex in the fibers complicated access to narrow recesses, especially access from below. Once the glass rod was formed into shape, it could be easily moved into position and would hold its position without support.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges. It is also expressly intended that the steps of the processes of using the various devices disclosed above are not necessarily restricted to any particular order.

The invention claimed is:

1. A device for treating a target, the device comprising:
   a. an IR source adapted and arranged to emit IR radiation from an emitter surface having a first surface area; and
   b. a set of elongate bodies consisting of one or more elongate bodies each being a rigid glass rod, each elongate body having an inlet, collectively referred to as the inlets, and each elongate body having an outlet, collectively referred to as the outlets;
   wherein the set of elongate bodies is in direct or indirect contact with the IR source via a glass coating covering the IR source;
   wherein IR radiation emitted from the IR source is coupled into the set of elongate bodies via the inlets and decoupled from the elongate body via the outlets over an outlet surface having a second surface area; and
   wherein the first surface area is greater than the second surface area.

2. The device according to claim 1, wherein the IR source comprises a thermal emitter.

3. The device according to claim 1, wherein the IR source comprises a semiconductor.

4. The device according to claim 1, wherein the IR source comprises an IR-LED.

5. The device according to claim 1, wherein the IR source has one or more of the following properties:
   a. an emitter surface with an optical power flux in the range from 1 to 250 W/cm2;
   b. a peak emission wavelength in the range from 800 to 1,600 nm;
   c. a bandwidth of emission wavelength in the range from 1 to 50 nm; and
   d. total power output in the range from 10 W to 100 kW.

6. The device according to claim 1, wherein the IR source has one or more of the following properties:
   a. an emitter surface with an optical power flux in the range from 1 to 60 W/cm2;
   b. a peak emission wavelength in the range from 800 to 3,000 nm;
   c. a bandwidth of emission wavelength in the range from 100 to 4,800 nm;
   d. total power output in the range from 10 W to 100 kW; and
   e. comprises an electrical insulator at a temperature in the range from 200° C. to 1,100° C. during normal operation.

7. The device according to claim 1, wherein the IR radiation source comprises IR source elements corresponding one-to-one to the set of elongate bodies and wherein the light from each IR source element couples into the corresponding elongate body.

8. The device according to claim 1, wherein the device is arranged and configured to provide a maximum total power output from the outlets in the range from 10 W to 10 kW.

9. A heat-treated target obtained by applying IR radiation to a target from the device according to claim 1.

10. A process for making a heat-treated substrate, the process comprising the following steps:
   a. providing a substrate having a cavity and a target located inside the cavity;
   b. providing an IR source outside the cavity;
   c. providing a set of elongate bodies consisting of one or more elongate bodies each being a rigid glass rod, each elongate body having an inlet outside the cavity and an outlet inside the cavity, wherein the set of elongate bodies is in direct or indirect contact with the IR source via a glass coating covering the IR source; and
   d. transferring IR radiation emitted by the IR source to the target via the elongate bodies to obtain the heat-treated substrate.

11. A heat-treated target obtained by the process according to claim 10.

12. A process for making a composite comprising the following process steps:
   a. providing a heat-treated target according to claim 11;
   b. providing a further part; and
   c. contacting the heat-treated target with the further part to obtain the composite.

13. A composite obtained by the process according to claim 12.

14. A use of a device according to claim 1 for improving location selectivity of heating.

15. The device according to claim 7, further comprising an optical element positioned between each IR source element and the corresponding elongate body.

16. A process for making a composite comprising the following process steps:
   a. providing a heat-treated target according to claim 9;
   b. providing a further part; and
   c. contacting the heat-treated target with the further part to obtain the composite.

17. A composite obtained by the process according to claim 16.

* * * * *